J. KACZMARCZYK.
AUTOMOBILE FENDER.
APPLICATION FILED JULY 2, 1919.
1,320,476.
Patented Nov. 4, 1919.
2 SHEETS—SHEET 1.
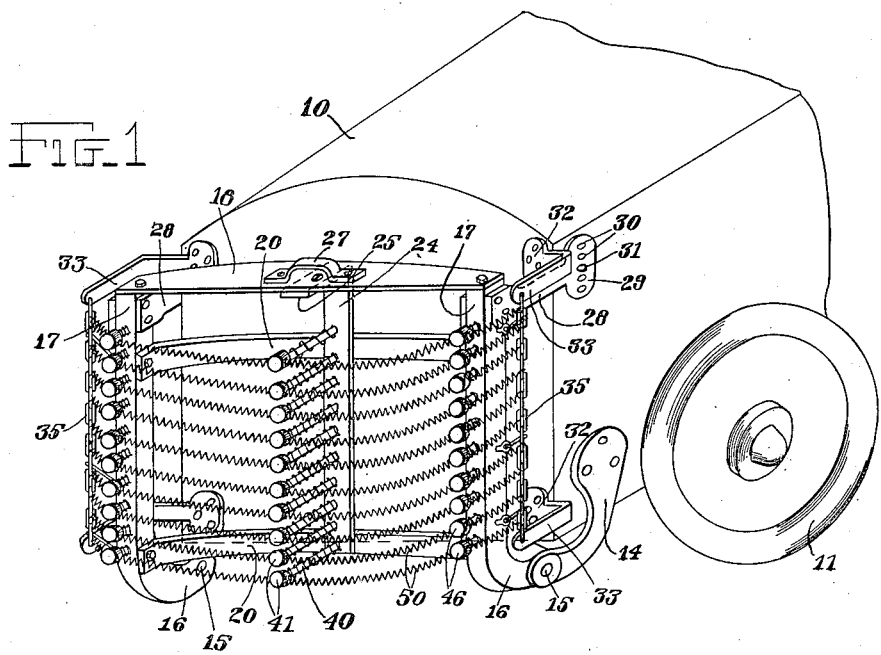
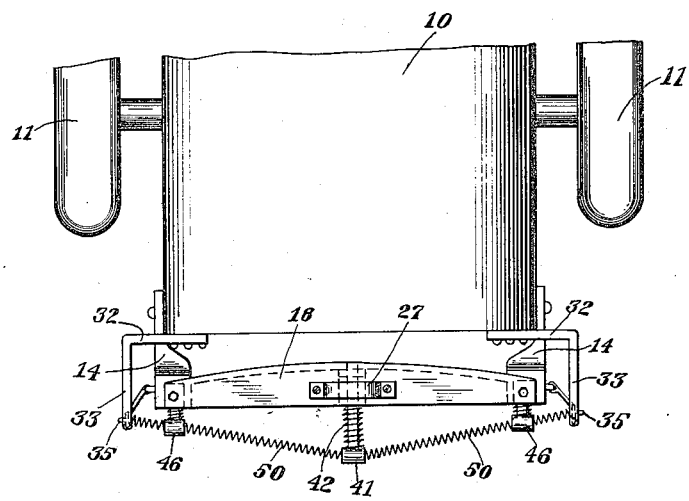
Inventor
Jos. Kaczmarczyk.
By his Attorney
Adam E. Schatz

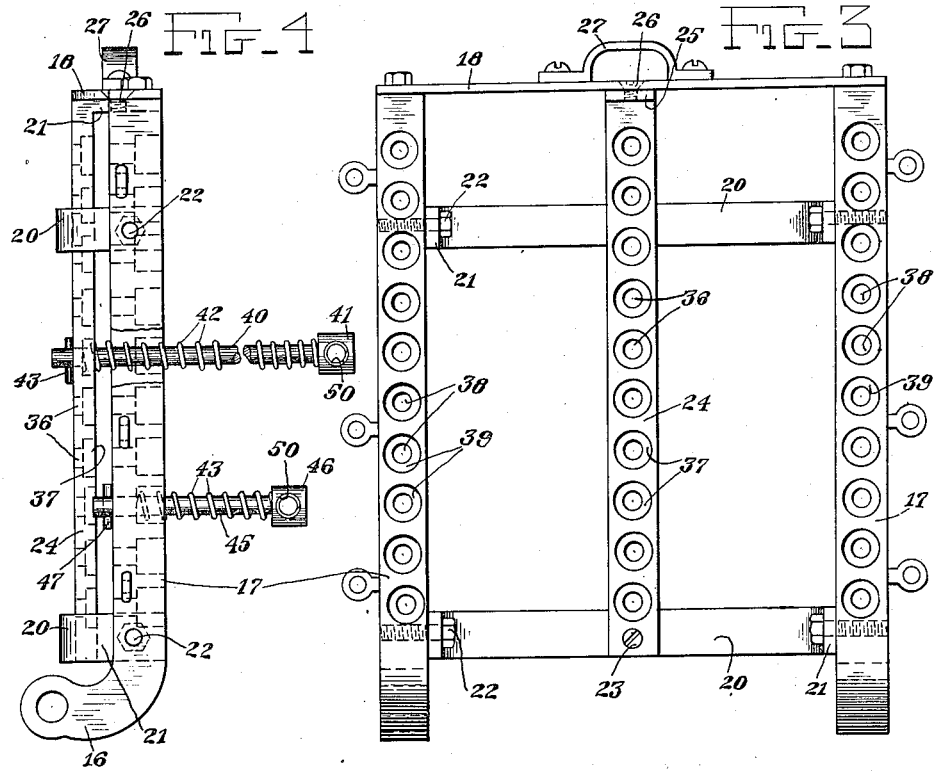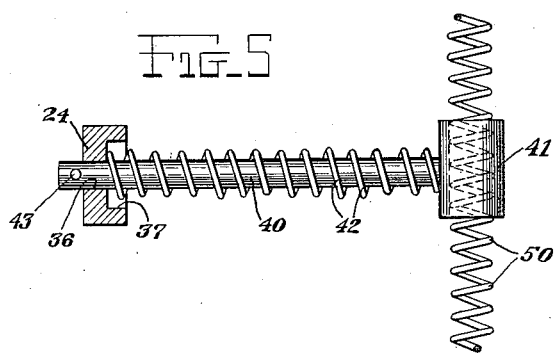

UNITED STATES PATENT OFFICE.

JOSEPH KACZMARCZYK, OF DETROIT, MICHIGAN.

AUTOMOBILE-FENDER.

1,320,476.  Specification of Letters Patent.  Patented Nov. 4, 1919.

Application filed July 2, 1919. Serial No. 308,284.

*To all whom it may concern:*

Be it known that I, JOSEPH KACZMARCZYK, residing at 91 Hammond street, Detroit, county of Wayne, and State of Michigan, have invented certain new and useful Improvements in Automobile - Fenders, of which the following is a specification.

This invention relates to improvements in automobile fenders and has as its special object the provision of means for making a resilient contact with persons or objects accidentally disposed in the pathway of the vehicle, whereby such persons or objects are so received as to avoid severe injury. A further object is to provide such means in forms which may be readily engaged with an automobile or other vehicle by any ordinary mechanic or removed at will when desired.

These and other like objects are attained by the novel construction and combination of parts hereinafter described and shown in the accompanying drawings, forming a material part of this disclosure, and in which—

Figure 1 is a perspective view showing the front portion of a conventional type of automobile, and indicating the application of the invention.

Fig. 2 is a top plan view thereof.

Fig. 3 is a front elevational view showing the fender frame.

Fig. 4 is a side elevational view thereof, and

Fig. 5 is a fragmentary transverse sectional view showing one of the supporting elements.

Referring to the drawings, the numeral 10 indicates the front end of a conventional type of car, the same resting upon wheels 11, as is common.

Securely attached upon each side of the car are a pair of downwardly curved brackets 14, in which, pivoted on the pins 15, are the lower, rearwardly extending elements 16 of a pair of side frames 17, these frames extending upward to a point substantially level with the upper front portion of the vehicle and are connected rigidly together by a cross plate 18, forming a top or cover for the frame.

Engaged between the frame elements 17 at points near the bottom and top thereof, are a pair of space bars 20, having forwardly extending flanges 31 held by the screws 22 to the side frame.

Engaged centrally on the bars 20, by the screws 23, is a vertical bar 24, having a forwardly turned front end 25, secured by a screw 26 to the top plate 18, over which is a handle element 27, by which the device may be manipulated.

Attached to the upper end of the horizontal frame elements 17 are arms 28, extending rearwardly and formed with pads 29 containing a plurality of apertures 30, which are engageable with the pins 31, fixed in the sides of the vehicle body, so that a certain amount of adjustment of the frame is obtainable.

Attached to the front of the vehicle body are pairs of pads 32 arranged upon opposite sides, from which extend arms 33 to the front, having openings in their offset surfaces receptive of the ends of chains 35, extended vertically at the front corners of the vehicle body.

A plurality of openings 36, having counter-sunk recesses 37 are formed through the vertical bars 24; similar openings 38 having recesses 39, being formed in each of the side bars 17.

Slidably engaged in the openings 36 are rods 40, having elongated transverse heads 41 at their outer ends, the rods being encircled by helically coiled compression springs 42, abutting against the heads 41 and countersunk recesses 37, cotter pins 43 preventing the rods from moving out of the bars 24.

Similarly other, shorter rods 45 having heads 46, and stop pins 47 are pressed outwardly through openings 38 by the coiled compression springs 48.

Passing through transverse openings formed in the heads 41, are coiled springs 50, their outer ends passing through the heads 46 and eventually are connected with the links of the chains 35, and as the coiled springs 50, are arranged in vertical rows from top to bottom of the frame structure, it will be apparent that upon the impact of a body against the same, that the plungers 40 and 45 will be pressed inwardly against the springs 42 and 48, giving a cushioning effect to the person or thing which is received resiliently on the spring structure so as to avoid damage in coming in contact therewith.

It will also be apparent that due to the construction, the buffer may be removed or engaged with a vehicle, as may be desired.

Having thus described my invention what I claim as new and desire to secure by Letters Patent, is—

1. In a fender, the combination with a frame extending at the front of a vehicle, said frame having a pair of side and a center bar vertically mounted, horizontal plungers movable in said bars, springs adapted to maintain said plungers in an extended position, a plurality of springs passing transversely through the heads of said plungers, and means for loosely engaging the ends of said springs with said vehicle.

2. In a vehicle fender, the combination with a pair of brackets secured to the front corners of the vehicle, vertical frame bars pivotally supported in said brackets, and a vertical center bar, of connections between all said elements, brackets extending outwardly at the side of said vehicle, chains extending between said brackets, a vertical row of plungers movable in said side and center bars, said plungers being horizontally arranged, compression springs encircling said plungers, heads formed with said plungers having a transverse bore, and a plurality of springs passing through the bore of said plungers, the ends of said springs being engaged with the links of said chains.

3. In a vehicle fender, the combination with a pair of brackets rigidly engaged at the front corners of the vehicle, and extending laterally and in advance thereof, of a pair of vertical bars pivoted in the lower of said brackets, means for adjusting the upper brackets, horizontal bars engaging between said vertical bars, a center vertical bar secured to said horizontal bars, a plate engaged with all of said bars at the top thereof, means on said plate whereby it may be manipulated, a plurality of relatively long plungers extending through said center bar, a plurality of relatively short plungers extending through said side bars, heads formed with all of said plungers, springs encircling said plungers adapted to force said heads outwardly, brackets extending laterally from the front of said vehicle body, chains engaged in said bracket extending vertically therebetween, and a plurality of coiled tensional springs engaged with the links of said chains and passing through openings formed in the heads of said plungers.

4. In a vehicle fender, the combination with supports engaged with a vehicle, plungers movable in said supports, means for normally holding said plungers extended at length, chains supported at both ends at the front of said vehicle, and a plurality of spring elements engaged with links of said chains passing through the outer end of said plungers whereby a resilient mat is produced.

In testimony whereof I have affixed my signature.

JOSEPH KACZMARCZYK.